(No Model.)
E. GARNIER & S. J. PRESCOTT.
HORSE COLLAR.
No. 555,087. Patented Feb. 25, 1896.
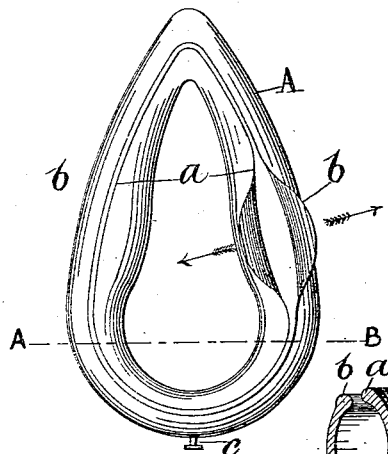
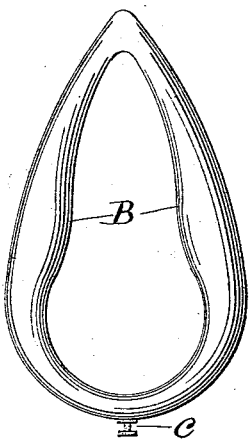
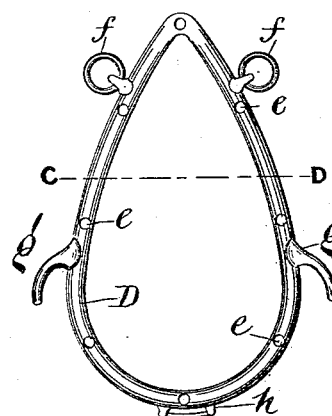
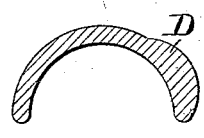
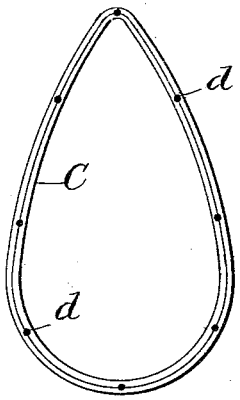
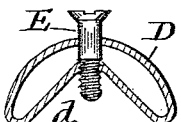
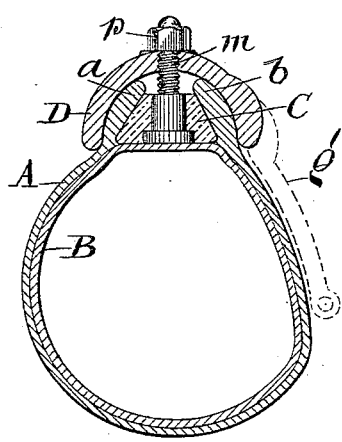
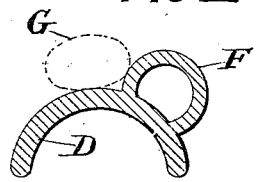
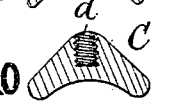
Witnesses
H. van Oldenneel
E. A. Scott
Inventors
Edmond Garnier
Samuel James Prescott
by Richardson
Attorney

UNITED STATES PATENT OFFICE.

EDMOND GARNIER AND SAMUEL JAMES PRESCOTT, OF LONDON, ENGLAND.

HORSE-COLLAR.

SPECIFICATION forming part of Letters Patent No. 555,087, dated February 25, 1896.

Application filed December 3, 1895. Serial No. 570,885. (No model.) Patented in England February 6, 1895, No. 2,572, and October 31, 1895, No. 20,601.

*To all whom it may concern:*

Be it known that we, EDMOND GARNIER, engineer, of 309 Camberwell New Road, and SAMUEL JAMES PRESCOTT, pawnbroker, of 33 Church Street, Camberwell, London, S. E., England, subjects of Her Majesty the Queen of Great Britain and Ireland, have invented certain new and useful Improvements in Collars for Horses and other Beasts of Burden, (for which we have applied for patents in Great Britain, No. 2,572, dated February 6, 1895, and No. 20,601, dated October 31, 1895,) of which the following is a specification.

Our invention relates to improvements in collars for horses and other beasts of burden, and applies both to solid collars, or such as are stuffed or filled with straw or other material, and to hollow collars, or such as are inflated with air under pressure, our said invention having for its objects, first, to provide means whereby the stuffing of solid collars or the air-bag of inflated collars may be easily and quickly removed and replaced by a fresh or repaired stuffing or air bag by the hostler, groom, or other person in charge; second, to provide a rigid frame or frames for such collars that may serve the double purpose of effectually maintaining the longitudinal and lateral rigidity of the collar and serve as a fore-wale for the reception of the hames, or by the addition or fixation thereto of the usual rein-rings, trace-lugs and martingale-loop to itself serve as hames and so dispense with the said fore-wale.

In order that our invention may be fully and clearly understood, reference may be made to the accompanying drawings, of which—

Figure 1 is a front view of the collar-body as we prefer to construct it for the purposes of our present invention. Fig. 2 is an enlarged section of same, taken upon the line A B, Fig. 1. Fig. 3 is a front or back view of the air bag or chamber for inflation as adapted for use with Fig. 1. Fig. 4 is a front view of the frame as we prefer to construct it when this is to take the place of and act as hames. Fig. 5 is an enlarged sectional view of any part of Fig. 4, such, for instance, as C D. Fig. 6 is a part view of the inner frame or key hereinafter explained. Fig. 7 is a section of any part of Fig. 6 as we prefer to construct this when the section of Fig. 4 is as at Fig. 5. Fig. 8 is an enlarged section similar to Fig. 5, but illustrating how the said frame or hames may be hollow, Figs. 9 and 10 being enlarged sections of Fig. 6, constructed to be adapted for use with Fig. 8. Fig. 11 is an enlarged sectional view of Fig. 4, as we may construct this when used as a fore-wale for the reception of ordinary hames. Fig. 12 is an enlarged sectional view of either side of our improved collar as it would appear when the sections of Figs. 4 and 6 are as shown by Figs. 5 and 7.

For the purposes of our invention, as relates to inflated collars, we construct the hollow body A of the collar of rubber, rubber composition, or of a compound of either of these, and canvas, cloth, leather, or other suitable resilient fabric or material, or of leather only, and which may be of one or any number of plies or thicknesses, sewed, stitched, solutioned, or otherwise connected to each other, according to the material employed, or the inner ply or plies may be of either of the first-named materials, or composition of materials, while the outer may be of leather only, and the said body may be brought to the shape or configuration desired by molding, blocking, or other means, or be composed of any number of molded, blocked or otherwise suitably-shaped pieces, stitched or otherwise connected together to form the whole body.

In the face of the body A we provide a preferably-endless slit or division all round, parallel with the outer edge and approximately centrally of its width, or, in other words, at the part where the fore-wale of ordinary stuffed collars usually occurs, the two edges formed by such slit being hereinafter referred to by *a* and *b*, and in Fig. 1 these are shown at one part turned back in the direction of the arrows to illustrate how these may be parted all round for the insertion of the air-chamber B, Fig. 3, or for the removal of same when necessary for repairs or renewal. The said air-chamber may be constructed of rubber, rubber composition, or other air-proof material, and may be in any number of parts so as to form separate cells or chambers, each of which may be provided with its own non-return valve for inflation; but in Fig. 3 we have chosen to show this as forming one chamber, the shape and configuration of which may be similar to that of the body A, any part of which may be provided with a suitable non-return valve c, but preferably at its lower end, as shown, a suitable aperture being left in the bottom of A, through which this may protrude and be fixed ready for the attachment of a force-pump, as shown at Fig. 1, and when the said air-chamber has been placed in A the molding, blocking or otherwise construction of the latter would permit the edges a b to resume their normal position, as shown by the left of Fig. 1, such edges being preferably swollen or thickened, as shown at Figs. 2 and 12, to effect which we may connect an extra ply or plies of the material A or insert a cord or wire within the said edges, as may be most convenient, and immediately behind the slit or opening formed by a b and between this and the air-chamber B we place a frame C, Fig. 6, hereinafter referred to as the "key," which may be of metal, wood, vulcanized rubber, vulcanite or other rigid material, and may be in one or more parts, singly or collectively of such shape in plan as to follow that of the opening a b, and of any desired shape or configuration in cross-section as may be best suited to the sectional shape or configuration of the hame or frame or fore-wale. The said frame C may have any number of suitably-disposed holes d, in each of which would be placed a bolt or screw with their threaded ends protruding through the slit a b; or, in some cases, threaded studs may be cast or otherwise formed integrally with C; or in lieu of said holes d and the said bolts or screws, clips, buttons or headed studs may be fixed upon the face of C.

The frame or hames D, Fig. 4, would be of the same shape in plan as the frame C and be provided with corresponding holes e, the sectional formation of the inner surface of the frame D being such as may be found most suitable according to the outer formation of the frame C. The said frame or hames D may be of metal, wood, vulcanite, bone or other rigid material, preferably metal, in one endless piece, our object being that this may be absolutely rigid in all directions, and may have connected thereto or formed therewith the usual rings f, trace-lugs g, and martingale-loop h.

In Fig. 12 we show a section of our improved collar, in which we have presumed that the cross-sectional formation of the frame or key C is in the shape of a trapezoid or the vertical section of a truncated cone, as at Fig. 7, with bolts m passing through the holes d, while the sectional formation of the frame or hames D is semicircular or thereabout, as at Fig. 5. The air chamber or chambers B and key C having been placed in position within A, as stated, the swelled edges a b would be slightly parted by the key C or screws or bolts of same, and the frame or hames D would be then laid upon and inclose these edges, and the bolts or screws m pass outwardly through the holes e and receive nuts, such as p, and as these were screwed home the edges a b would be firmly gripped between the frames C and D, as shown, when the air chamber or chambers B may be inflated and the collar would be complete and ready for use, and by the simple removal of the nuts p the hame D and frame C may be removed and the air chamber or chambers B taken out for repairs or renewal and again replaced and secured in the manner stated with reference to Fig. 12; or when the face of the frame C is provided with clips, buttons or headed studs, instead of the holes d, these would pass through the holes e in the frame D or slits in lieu of said holes and be turned upon the face of D, or the frame D be provided with catches or clips for engaging therewith.

In Fig. 8 we show how we may form the hames D of hollow metal or other material, the inner formation of which and the outer formation of the key C, Figs. 9 or 10, coinciding, and in the latter views we illustrate how the key C may have internally-threaded holes d, with which may engage screws E first passed through the holes e of the hames or frame D, which as screwed home would grip the edges a b between them, as at Fig. 12. These views, Figs. 8, 9, and 10, are intended to show that we may construct the frames C and D in various forms in cross-section and effect their attachment to each other in a variety of ways without departing from the principle of our invention.

In Fig. 11 we illustrate how the frame D may be constructed with a swelling, such as F, so as to form and take the place of the ordinary fore-wale of a collar, which permits that, while the frame D, in combination with the key C, would effectually preserve the rigidity of the inflated collar A, such hames as at present used upon ordinary collars and already provided with the accessories f g h before mentioned may be conveniently employed upon our improved collar, the position of such hames being indicated by G in dotted outline in Fig. 11.

From the foregoing it will be understood that puncture of the air-chamber B is next to impossible, as the texture of the material of which A would in practice be made would effectually preclude this; and, further, that a groom, hostler, or other layman, being in possession of a duplicate chamber B, could easily remove the old or worn-out one and replace it with a new one (while the old one was being repaired) without any special knowledge or skill in the manufacture of such collars generally; and, further, that the absolute rigidity of the frame D, whether used as hames or constructed to form a fore-wale for the reception of ordinary hames, as at Fig. 11, effectually precludes all possibility of the body A becoming distorted or buckled laterally with the heaviest load or to wring or injure the withers or shoulders of the animal, while this manner of fixing D also prevents (when used as hames) possible accidents through the imperfect strapping on of the hames, as obtains in collars of ordinary construction.

From the foregoing it will be understood that by substituting a solid or stuffed body in lieu of the inflated body B, Fig. 3, the principle and objects of our invention are equally applicable in the manufacture of solid or stuffed collars.

In the manufacture of solid collars it has hitherto been customary to form the outer facing of these of thick leather, while the inner facing was of thin leather or flannel or similar absorbent fabric, the whole having a lining or stuffing of straw, and in wet weather it frequently happens that at the end of the day's work the said lining and stuffing have become saturated with rain or melted snow, and, by reason of the usual absence from stables of means for drying the said wet collar, this in its said wet and cold condition is again placed upon the neck of the animal to perform the next day's work, thus inducing sore throat, chafed withers or shoulders and other ailments; but if the said collar be provided with a slit *a b* and frames, such as D and C, and portable stuffing B, according to our invention, by simply disconnecting from each other the frames D and C the hostler, groom, or carman could easily remove the said wet stuffing B and replace it with a dry one, leaving the first to get dry while the second was in use.

According to our invention, in the construction of such stuffed collars, we prefer to provide the casing of the collar A entire and of the waterproof material before mentioned and without the said flannel lining, in which case it would not be possible for the said stuffing to become wet or even damp in wet weather, a wash-leather passed over the inner surface of the collar being all that would be necessary to render the collar ready for use the next day.

According to our invention we prefer to form the stuffing B entire, so that this may be easily removed when worn out and replaced by a new one, and we may construct the said stuffing by the employment of waste cork, flocks, horse-hair, straw or hay or other soft material suitable for the purpose.

Having now fully described and shown our said invention, what we claim, and desire to secure by Letters Patent, is—

1. In combination in a horse-collar or the like, an inner chamber or stuffing, an outer covering having projecting portions or lips, a frame having inclined walls located between said lips and a clamp covering the lips and binding them against the frame, substantially as described.

2. In combination, an inner chamber or stuffing, an outer covering having projecting portions or lips, a frame located between said lips, a hame-frame covering said lips and connections between said hame-frame and frame C for securing the parts together and binding the lips to the frame C, substantially as described.

In witness whereof we have hereunto set our hands in presence of two witnesses.

EDMOND GARNIER.
SAMUEL JAMES PRESCOTT.

Witnesses:
SAMUEL JOHN EARL,
GEORGE THOMAS HYDE.